(12) United States Patent
Porte et al.

(10) Patent No.: US 11,643,216 B2
(45) Date of Patent: May 9, 2023

(54) AIRCRAFT ENGINE NACELLE COMPRISING A SYSTEM OF ICE PROTECTION

(71) Applicant: Airbus Operations SAS, Toulouse (FR)

(72) Inventors: Alain Porte, Colomiers (FR); François Pons, Daux (FR); Gregory Albet, Grepiac (FR); Maxime Zebian, Saint-Sauveur (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 681 days.

(21) Appl. No.: 16/655,406

(22) Filed: Oct. 17, 2019

(65) Prior Publication Data

US 2020/0122844 A1 Apr. 23, 2020

(30) Foreign Application Priority Data

Oct. 19, 2018 (FR) ...................................... 1871236

(51) Int. Cl.
*B64D 15/04* (2006.01)
*B64D 29/00* (2006.01)
*B64D 33/02* (2006.01)
*F02C 7/047* (2006.01)
*F01D 25/02* (2006.01)

(52) U.S. Cl.
CPC ............. *B64D 15/04* (2013.01); *B64D 29/00* (2013.01); *B64D 33/02* (2013.01); *F01D 25/02* (2013.01); *F02C 7/047* (2013.01); *B64D 2033/0233* (2013.01)

(58) Field of Classification Search
CPC ......... F01D 25/02; B64D 15/02; B64D 15/04; B64D 15/06; B64D 29/00; B64D 33/02; B64D 2033/0233; F02C 7/047
See application file for complete search history.

(56) References Cited

U.S. PATENT DOCUMENTS

| 2008/0053100 | A1 | 3/2008 | Venkataramani et al. |
| 2008/0159852 | A1* | 7/2008 | Stephenson ............. F01D 5/046 415/178 |
| 2011/0133025 | A1* | 6/2011 | Vauchel ................. F02C 7/045 244/1 N |
| 2012/0048389 | A1 | 3/2012 | Chelin et al. |
| 2012/0085867 | A1 | 4/2012 | Bardwell |
| 2012/0317782 | A1* | 12/2012 | Porte ...................... B64D 33/02 29/428 |

(Continued)

FOREIGN PATENT DOCUMENTS

| EP | 1895123 A2 | 3/2008 |
| GB | 2470043 A | 11/2010 |
| WO | 2010086560 A2 | 8/2010 |

OTHER PUBLICATIONS

French Search Report; for FR 1871236, dated Jun. 4, 2019.

*Primary Examiner* — Christopher Verdier
(74) *Attorney, Agent, or Firm* — Greer, Burns & Crain, Ltd.

(57) ABSTRACT

An anti-icing protection system for an aircraft engine nacelle, the nacelle comprising an inner shroud, an air intake lip forming a leading edge of the nacelle, the protection system comprising a heat exchanger device including at least one heat pipe configured to transfer heat emitted by a heat source to the inner shroud.

6 Claims, 2 Drawing Sheets

(56) References Cited

U.S. PATENT DOCUMENTS

| | | | |
|---|---|---|---|
| 2012/0318029 A1* | 12/2012 | Porte | B21D 47/00 |
| | | | 72/54 |
| 2013/0098471 A1* | 4/2013 | Porte | B64D 33/02 |
| | | | 137/15.1 |
| 2014/0216846 A1* | 8/2014 | Hurlin | B64D 29/00 |
| | | | 156/60 |
| 2016/0097323 A1* | 4/2016 | Prather | F01D 25/02 |
| | | | 415/178 |
| 2017/0259926 A1* | 9/2017 | Anderson | B64D 15/04 |
| 2019/0118955 A1* | 4/2019 | Porte | B64D 33/02 |
| 2019/0233127 A1* | 8/2019 | Carcone | B64D 15/22 |
| 2020/0122843 A1* | 4/2020 | Porte | B64D 33/02 |

* cited by examiner

AIRCRAFT ENGINE NACELLE COMPRISING A SYSTEM OF ICE PROTECTION

CROSS-REFERENCES TO RELATED APPLICATIONS

This application claims the benefit of the French patent application No. 1871236 filed on Oct. 19, 2018, the entire disclosures of which are incorporated herein by way of reference.

FIELD OF THE INVENTION

The present invention relates to an aircraft engine nacelle comprising a system for protecting an air intake against icing.

BACKGROUND OF THE INVENTION

The leading edges of aircraft, in particular the air intake lips of the aircraft engine nacelles, may be subject to the formation of frost, which builds up to form blocks of ice. The formation of these blocks of ice may interfere with the supply of air to the engine. For example, blocks of ice may come loose and collide with the engine fan blades. The fan blades are therefore liable to be weakened, or even broken, thereby.

There exists an anti-icing protection system that bleeds hot air from compression stages of the aircraft engine in order to inject it into an annular space located behind the lip of the nacelle. The hot air then flows through the annular space, heats the lip and is sent into channels in acoustic panels in order to heat the skin of said acoustic panels. However, the skin of the acoustic panels is heated over a short distance, which results in deicing over a short distance. This distance may be insufficient for very short air intakes. Specifically, the shortening of the air intakes may result in the surface of the acoustic panels becoming aerodynamically more sensitive.

SUMMARY OF THE INVENTION

An object of the present invention is to overcome these drawbacks by providing an anti-icing protection system for a nacelle.

To this end, the invention relates to an anti-icing protection system for an aircraft engine nacelle, the nacelle comprising an inner shroud having an internal face, an air intake lip having an internal face and forming a leading edge of the nacelle, and a front frame which, with the lip, defines an annular space.

According to the invention, the protection system comprises a heat exchanger device comprising at least one heat pipe configured to transfer heat emitted by a heat source in the annular space to the inner shroud situated downstream of the front frame.

Thus, by virtue of the invention, the air intake lip of the nacelle is deiced under the same conditions as in the prior art, but part of the inner shroud situated behind the front frame also benefits from the deicing. Such a heat exchanger device therefore makes it possible to protect the lip and the inner shroud from icing in a more effective and economical way by virtue of the heat pipe or heat pipes. The heat emitted by a heat source is used to deice a more extensive zone of the nacelle, extending from the annular space as far as the inner shroud. In addition, by virtue of this system, it is advantageous to offset the front frame forwards, towards the leading edge of the nacelle, thereby reducing the volume of the annular space. This advantage makes it possible to reduce the hot air flow needed to deice the volume of the annular space.

According to particular embodiments of the invention:
the heat exchanger device further comprises a heat-transfer fluid, at least one evaporator connected thermally to the heat source, the evaporator or evaporators being configured to extract at least some of the heat supplied by the heat source, the extracted heat being transferred to the heat-transfer fluid, at least one condenser fixed to the internal face of the inner shroud situated downstream of the front frame, the condenser or condensers being configured to supply at least some of the heat extracted by the evaporator or evaporators, the extracted heat being transferred to the condenser or condensers via the heat-transfer fluid, each of the evaporators being fluidically connected to at least one condenser via at least one heat pipe in which the heat-transfer fluid circulates.
the evaporator or evaporators are fixed to the internal face of the air intake lip upstream of the front frame.
the heat pipe or heat pipes are pulsating heat pipes. This feature avoids repeated maintenance operations.
the heat pipe or heat pipes are loop heat pipes.
the heat pipe or heat pipes comprise at least one liquid pipe configured to convey, from the condenser to the evaporator, the heat-transfer fluid liquefied by cooling in the condenser.
the heat pipe or heat pipes comprise at least one capillary tube containing a constant-volume fluid.
the evaporator or evaporators are distributed over the entire internal face of the lip.
the condenser or condensers are distributed over the entire internal face of the inner shroud.

BRIEF DESCRIPTION OF THE DRAWINGS

The invention will be better understood on reading the following description and on examining the appended figures.

DETAILED DESCRIPTION OF THE PREFERRED EMBODIMENTS

Figure 1:
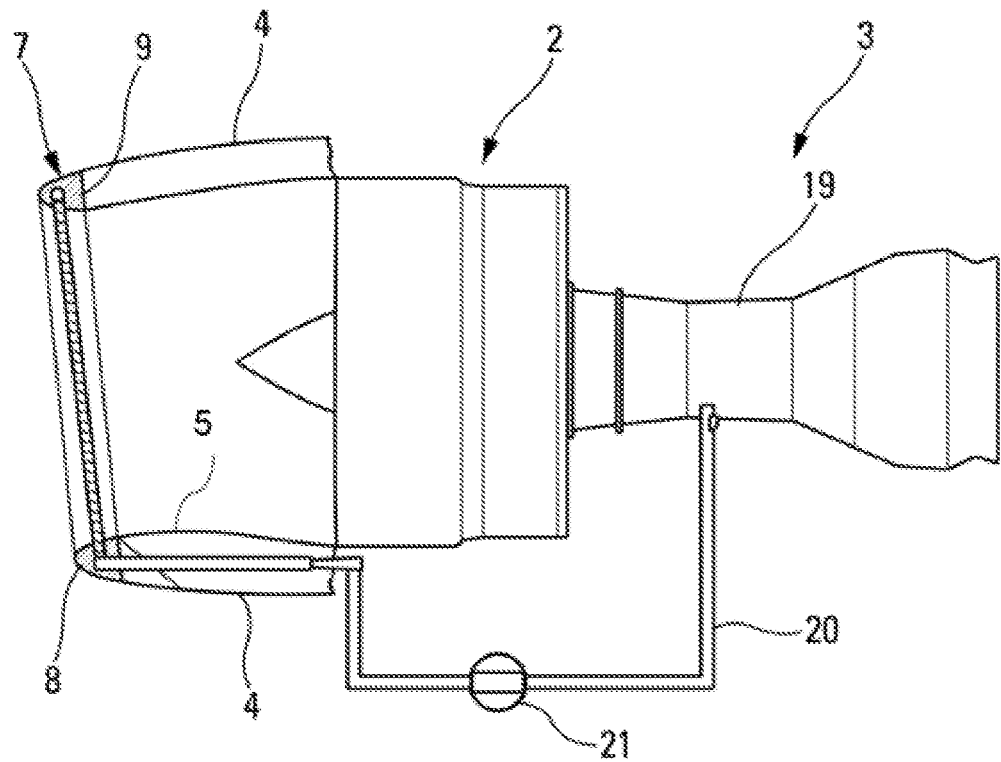
FIG. 1 depicts a side view of an aircraft engine comprising a supply of hot air to the annular space of the lip.
Figure 2:
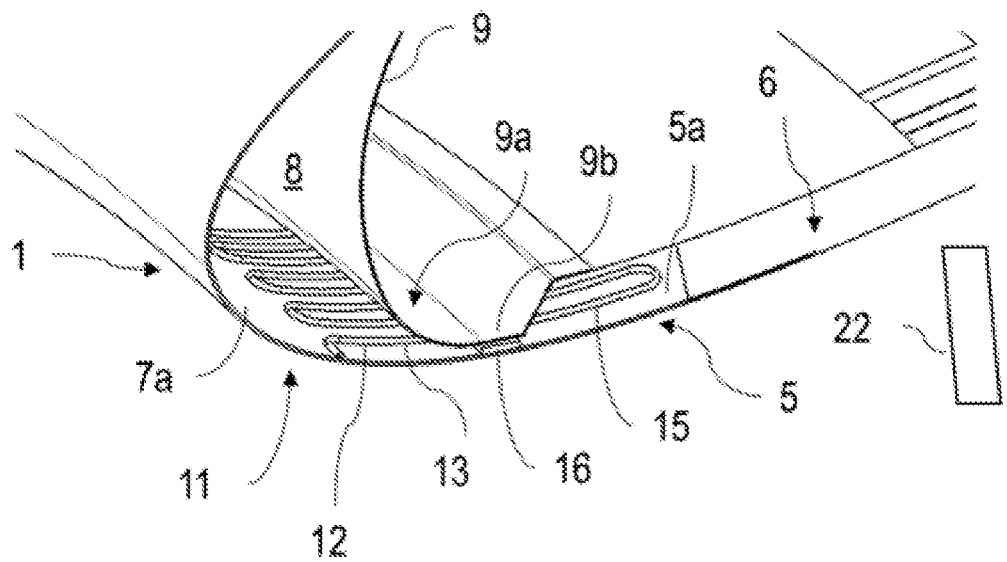
FIG. 2 depicts a longitudinal section through a lip comprising the anti-icing protection system according to one embodiment.

FIG. 2 schematically depicts one embodiment of an anti-icing protection system for an aircraft engine 3 nacelle 2.

A engine 3 nacelle 2 refers to a fairing surrounding an aircraft engine 3 such as a turbofan.

The nacelle generally comprises an outer shroud 4, an inner shroud 5 having an internal face 5a and an air intake lip 7. The two shrouds 4 and 5 are generally coaxial and form a space between them. The lip 7 joins the two shrouds 4 and 5 together.

The outer shroud 4 forms an outer cowl of the nacelle 2. The inner shroud 5 is provided with at least one acoustic panel 6. The lip 7 forms a leading edge of the nacelle 2 and comprises an internal face 7a.

The lip 7 has an annular space 8 which is closed by a front frame 9. The front frame 9 separates the annular space 8 from the rest of the space formed between the two shrouds 4 and 5.

The nacelles 2 are usually fitted with acoustic panels 6 covering the inner wall of the nacelles 2 at the air intakes upstream of the fans 22. Generally, the acoustic panels 6 have a sandwich structure including one or more layers of honeycomb-like cellular structure suitable for trapping noise. This layer of cellular structure has an outer face covered with a porous layer, referred to as the acoustic skin, and an inner face covered with an impermeable layer, referred to as the solid skin. The composition of acoustic panels 6 is known from the prior art and depicted schematically in FIG. 2 and FIG. 3.

The protection system 1 comprises a heat exchanger device 11 configured to transfer heat 14 emitted by a heat source to the acoustic panel or panels 6.

The heat exchanger device 11 comprises at least one heat pipe 12 configured to convey the heat 14 from the heat source to the acoustic panel or panels 6.

A heat pipe 12 generally refers to a heat-conducting element operating according to the principle of heat transfer by phase transition of a fluid.

Figure 3:
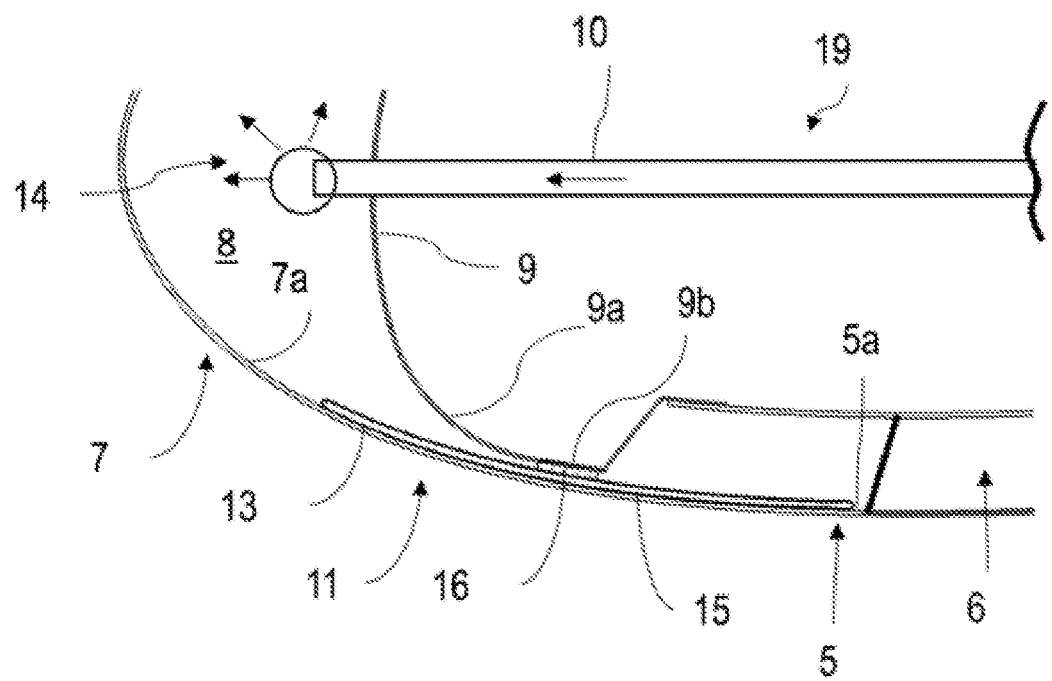
FIG. 3 depicts a view in cross section through a lip comprising the anti-icing protection system according to one embodiment.

The heat exchanger device 11 further comprises a heat-transfer fluid and at least one evaporator 13 thermally connected to the heat source and fixed to the internal face 7a of the air intake lip 7 by any suitable fixing means such as bonding or welding, upstream of the front frame 9. The evaporator or evaporators 13 are configured to extract at least some of the heat 14 supplied by the heat source. The heat 14 is then transferred to the heat-transfer fluid as illustrated in FIG. 2 and FIG. 3. According to one advantage of the invention, the evaporator or evaporators 13 are in direct contact with the heat 14 supplied by the heat source, thereby particularly improving the efficiency of the heat exchanger device 11.

The heat exchanger device 11 also comprises at least one condenser 15 fixed to the internal face 5a of the inner shroud 5 downstream of the front frame 9. The heat 14 extracted by the evaporator or evaporators 13 is transferred to the condenser or condensers 15 via the heat-transfer fluid. The condenser or condensers 15 are configured to deliver at least some of the heat 14 extracted by the evaporator or evaporators 13 to the acoustic panel or panels 6.

Throughout the document, what is meant by "upstream" is the zone situated in front of the front frame 9, in the direction of the leading edge of the nacelle 2, and what is meant by "downstream" is the zone situated behind the front frame 9, in the direction away from the leading edge of the nacelle 2.

According to this embodiment, the heat pipe 12 extends on either side of the front frame 9, the evaporator or evaporators 13 extending on the internal face 7a of the lip 7 in the direction of the leading edge of the nacelle 2, the condenser or condensers 15 extending on the internal face 5a of the shroud 5, in the direction away from the leading edge of the nacelle 2.

The heat pipe or pipes 12 comprise at least one liquid pipe configured to convey, from the condenser 15 to the evaporator 13, the heat-transfer fluid liquefied by cooling in the condenser.

As can be seen in FIG. 2 and FIG. 3, the lower part 9a of the front frame 9 is not directly fixed to the internal face 7a of the lip 7 but is fixed to a sealing device 16 interposed between the internal face 7a of the lip 7 and the lower part 9a of the front frame 9 while allowing the heat pipe or heat pipes 12 to be positioned. This sealing device 16 ensures that the heat 14 remains confined in the annular space 8 and does not therefore spread behind the front frame 9 into the space formed between the two shrouds 4 and 5.

Figure 4:
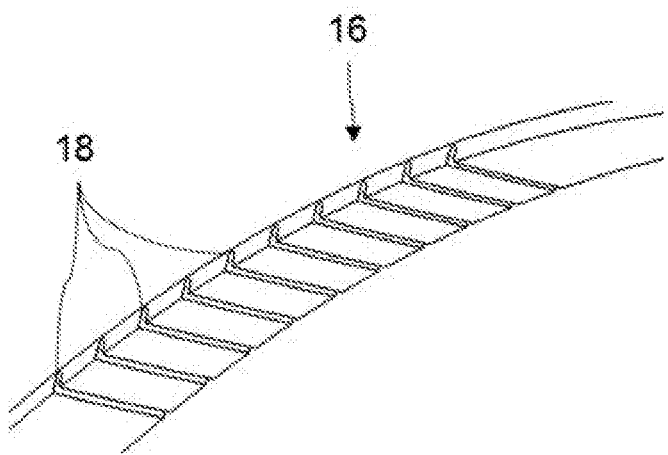
FIG. 4 depicts a schematic view of a sealing device of the anti-icing protection system according to one embodiment.

The sealing device 16 depicted in FIG. 4 is shaped to suit the shape of the heat pipe or heat pipes 12. It may take the form of a plate comprising notches 18 having the same shapes and dimensions as the liquid pipes of the heat pipe or pipes 12 and more specifically having the same shapes and dimensions as the evaporator or evaporators 13 or condenser or condensers 15. It is preferably manufactured from metal able to withstand the heat 14, such as titanium for example.

By virtue of this embodiment of the invention, the front frame 9 may be offset towards the leading edge of the nacelle 2. As a result, the volume of the annular space 8 is reduced. This advantage makes it possible to reduce the hot air 14 flow needed to deice the volume of the annular space 8.

Advantageously, the lower part 9a of the front frame 9 has a shape that curves towards the inside of the nacelle 2 and has a flat 9b to which the sealing device 16 is fixed. As a result, the sealing device 16 is fixed to the air intake lip 7 and to the flat 9b of the front frame 9 by any conventional fixing means.

For preference, the evaporators 13 are distributed over the entire internal face 7a of the lip 7.

For preference, the condensers 15 are distributed over the entire inner shroud 5.

Each of the evaporators 13 is fluidically connected to at least one condenser 15 by at least one heat pipe 12 as illustrated in FIG. 2 and FIG. 3.

Advantageously, the heat pipe 12 is a pulsating heat pipe. It comprises a sequence of capillary tubes containing a constant-volume fluid present in two phases, liquid and gas. The heat present on the side of the internal face 7a of the lip 7 will cause the liquid to vaporize into bubbles of gas at the evaporator or evaporators 13, causing the pressure to increase. The cold (ice) present on the side of the condenser or condensers 15 will convert the bubbles into liquid and cause a depression. This pressure gradient will allow the gasified heat-transfer fluid to move from the evaporator or evaporators 13 to the condenser or condensers 15 and allow the liquefied heat-transfer fluid to move from the condenser or condensers 15 to the evaporator or evaporators 13, thus giving rise to a transfer of heat.

Advantageously, the heat pipe 12 may be a loop heat pipe (LHP). The advantages of such a heat pipe are, in particular, that the heat transfer characteristics are better than with other types of heat pipe and that, whatever the position of the heat pipe 12, it maintains optimal operation.

The fluid used in the heat pipe is a fluid that meets the aeronautical requirements (with regard to fire, smoke, etc.) and the extreme conditions of flight (with regard to temperature, pressure, etc.).

The return of liquefied heat-transfer fluid to the evaporator 13, or the return of gasified heat-transfer fluid to the condenser 15 may be achieved by gravity or capillary action.

The evaporators 13 (or, respectively, the condensers 15) may be spaced apart by a distance from 3 mm to 15 mm depending on the desired quality of deicing, the diameter of the evaporators 13 and of the condensers 15 being able to vary from 3 mm to 4 mm.

In general, the annular space 8 is composed of two D-ducts forming a ring which is located between the leading edge and the front frame 9.

The annular space 8 of the lip is designed to receive a hot air supply 10, as depicted in FIG. 2.

According to one embodiment, the heat source corresponds to the hot air 10 supplied to the annular space 8 of the lip 7.

Nonlimitingly, the air 10 supplied to the annular space 8 of the lip 7 is generally heated to temperatures ranging from 250° C. to 450° C.

Advantageously, at least one heat pipe 12 is configured to transfer the heat 14 from the internal face 7a of the lip 7 to the inner shroud 5 situated downstream of the front frame 9.

The evaporator or evaporators 13 are thus configured to extract at least some of the heat 14 supplied by the hot air 10 supplied to the annular space 8 of the lip 7. The heat 14 is then transferred to the heat-transfer fluid as depicted in FIG. 2 and FIG. 3.

The hot air 10 supplied to the annular space 8 may come from an air-heating device 19 of the aircraft AC. The air-heating device 19 is configured to produce the hot air 10 being supplied to the annular space 8 of each of the nacelles 2.

For example, the aircraft AC comprises at least one duct 20 linking the air-heating device or devices 19 to the annular space 8 of each of the nacelles 2. The duct or ducts 20 are configured to convey the hot air 10 produced by the air-heating device 19 to the annular space 8 of the lip 7. The aircraft AC also comprises at least one valve 21 for each of the ducts 20 which is configured to regulate the pressure and the flow rate of the hot air 10 flowing through the duct or ducts 20.

The duct or ducts 20 may correspond to nozzles or piccolo tubes.

For example, the air-heating device 19 corresponds to compression stages of the engine 3 surrounded by the nacelle 2. Thus, the compression stages of an engine 3 supply hot air 10 to the annular space 8 of the lip 7 of the nacelle 2 which surrounds the engine 3.

Thus, the heating device 19 supplies hot air 10 to the annular space 8 of the lip 7. The hot air 10 then flows through the annular space 8 of the lip 7. The heat of the hot air 10 is then extracted by the evaporator or evaporators 13 fixed to the internal face 7a of the lip 7. To do this, the heat-transfer fluid in the evaporator or evaporators 13 is vaporized and is conveyed to the condenser or condensers 15. The heat is therefore transmitted to the inner shroud 5 via the condenser or condensers 15 in which the heat-transfer fluid is liquefied, supplying the heat to the condensers 15. The liquefied heat-transfer fluid then returns to the evaporator or evaporators 13 via the heat pipe or pipes 12.

This protection system 1 thus allows heat to be transferred effectively from the internal face 7a of the lip 7 to the inner shroud 5. Furthermore, because of the direct contact between the evaporator or evaporators 13 and the heat 14 supplied by the hot air 10 supplied to the annular space 8 of the lip 7, the protection system 1 allows the heat of the hot air to be used directly and therefore allows the heat 14 supplied by the hot air 10 to be used more effectively.

In addition, this system does not alter the structure of the acoustic panel which can be deiced by deicing means known from the prior art.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft engine nacelle comprising an anti-icing protection system, the nacelle comprising:
   an inner shroud having an internal face;
   an air intake lip having an internal face and forming a leading edge of the nacelle;
   a front frame which, with the lip, defines an annular space;
   wherein the protection system comprises a heat exchanger device comprising at least one heat pipe configured to transfer heat emitted by a heat source from the annular space to the inner shroud situated downstream of the front frame, wherein the at least one heat pipe is located within the annular space;
   a heat-transfer fluid;
   at least one evaporator connected thermally to the heat source, the at least one evaporator being configured to extract at least some of the heat supplied by the heat source, the extracted heat being transferred to the heat-transfer fluid;
   at least one condenser fixed to the internal face of the inner shroud and situated downstream of the front frame, the at least one condenser being configured to supply at least some of the heat extracted by the at least one evaporator to the inner shroud, the extracted heat being transferred to the condenser or condensers via the heat-transfer fluid; and
   the at least one evaporator being fluidically connected to the at least one condenser via the at least one heat pipe in which the heat-transfer fluid circulates.

2. The aircraft engine nacelle according to claim 1, wherein the at least one evaporator is fixed to the internal face of the air intake lip upstream of the front frame.

3. The aircraft engine nacelle according to claim 1, wherein the at least one heat pipe is a pulsating heat pipe.

4. The aircraft engine nacelle according to claim 1, wherein the at least one heat pipe is a loop heat pipe.

5. The aircraft engine nacelle according to claim 1, wherein the at least one heat pipe comprises at least one liquid pipe configured to convey, from the at least one condenser to the at least one evaporator, the heat-transfer fluid liquefied by cooling in the at least one condenser.

6. The aircraft engine nacelle according to claim 1, wherein the at least one heat pipe comprises at least one capillary tube containing a constant-volume fluid.

* * * * *